(12) United States Patent
Heath

(10) Patent No.: US 8,259,481 B1
(45) Date of Patent: Sep. 4, 2012

(54) VOLTAGE ADAPTER SYSTEM

(76) Inventor: Jerdeline W. Heath, Ft. Lauderdale, FL (US)

( * ) Notice: Subject to any disclaimer, the term of this patent is extended or adjusted under 35 U.S.C. 154(b) by 672 days.

(21) Appl. No.: 12/345,754

(22) Filed: Dec. 30, 2008

(51) Int. Cl.
 *H02M 7/42* (2006.01)
(52) U.S. Cl. .................................................... 363/146
(58) Field of Classification Search .................. 363/131, 363/142, 146; 439/504; 307/26, 150
See application file for complete search history.

(56) References Cited

U.S. PATENT DOCUMENTS

| | | | |
|---|---|---|---|
| 4,261,634 A * | 4/1981 | Robinson | 439/668 |
| 4,936,796 A | 6/1990 | Anderson, Jr. | |
| 5,599,204 A | 2/1997 | Glassford | |
| 5,766,020 A | 6/1998 | Hughes | |
| 5,949,640 A * | 9/1999 | Cameron et al. | 361/600 |
| 6,057,610 A | 5/2000 | Nierescher | |
| D429,689 S | 8/2000 | Barragan, Jr. | |
| 6,577,098 B2 * | 6/2003 | Griffey et al. | 320/104 |
| 6,747,246 B2 * | 6/2004 | Crandell, III | 219/130.1 |
| 6,894,457 B2 * | 5/2005 | Germagian et al. | 320/119 |
| 7,054,177 B2 * | 5/2006 | Wu | 363/146 |
| 7,149,099 B2 * | 12/2006 | Asbery | 363/142 |
| 7,161,253 B2 * | 1/2007 | Sodemann et al. | 290/1 A |
| 7,508,163 B2 * | 3/2009 | Batts-Gowins | 320/105 |
| 7,511,451 B2 * | 3/2009 | Pierce | 320/103 |
| 7,787,274 B2 * | 8/2010 | Chang | 363/146 |
| 7,990,102 B2 * | 8/2011 | Scheucher | 320/107 |
| 2002/0137382 A1 | 9/2002 | Shirakura et al. | |

\* cited by examiner

Primary Examiner — Gary L Laxton

(57) ABSTRACT

A voltage adapter system includes a voltage modifier to invert and regulate voltage. A primary female plug is mounted on the voltage modifier and is electrically coupled to the control actuator. The primary female plug is an electrical inlet. An electrical outlet is mounted on the voltage modifier and is electrically coupled to the control actuator. A pair of clamps is provided and each of the clamps is positionable on and electrically coupled to a pair of leads of a vehicle battery. A male plug is electrically coupled to the clamps. The male plug attached to the clamps is removably extended into and electrically coupled to the primary female plug to supply electricity to the voltage modifier from the vehicle battery. A plug from an electrically powered apparatus is extendable into the electrical outlet to receive electrical power from the voltage modifier.

3 Claims, 4 Drawing Sheets

VOLTAGE ADAPTER SYSTEM

BACKGROUND OF THE INVENTION

Field of the Invention

The present invention relates to voltage adapting devices and more particularly pertains to a new voltage adapting device for allowing direct connection to a vehicle battery to supply electrical current to electronic devices.

SUMMARY OF THE INVENTION

The present invention meets the needs presented above by generally comprising a voltage modifier to invert and regulate voltage. A primary female plug is mounted on the voltage modifier and is electrically coupled to the control actuator. The primary female plug is an electrical inlet. An electrical outlet is mounted on the voltage modifier and is electrically coupled to the control actuator. A pair of clamps is provided and each of the clamps is positionable on and electrically coupled to a pair of leads of a vehicle battery. A male plug is electrically coupled to the clamps. The male plug attached to the clamps is removably extended into and electrically coupled to the primary female plug to supply electricity to the voltage modifier from the vehicle battery. A plug from an electrically powered apparatus is extendable into the electrical outlet to receive electrical power from the voltage modifier.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
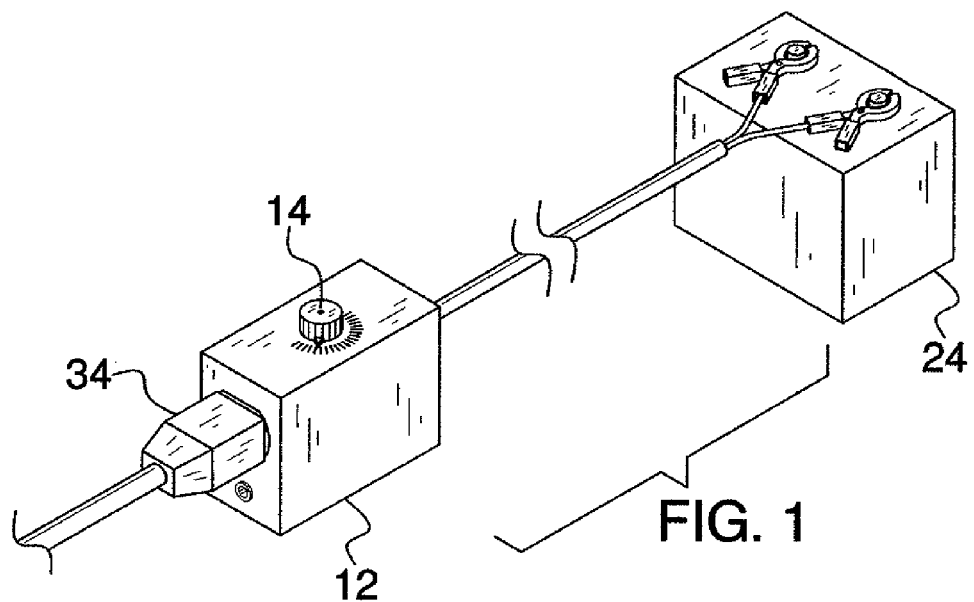
FIG. 1 is a front perspective in-use view of a voltage adapter system according to the present invention.
Figure 2:
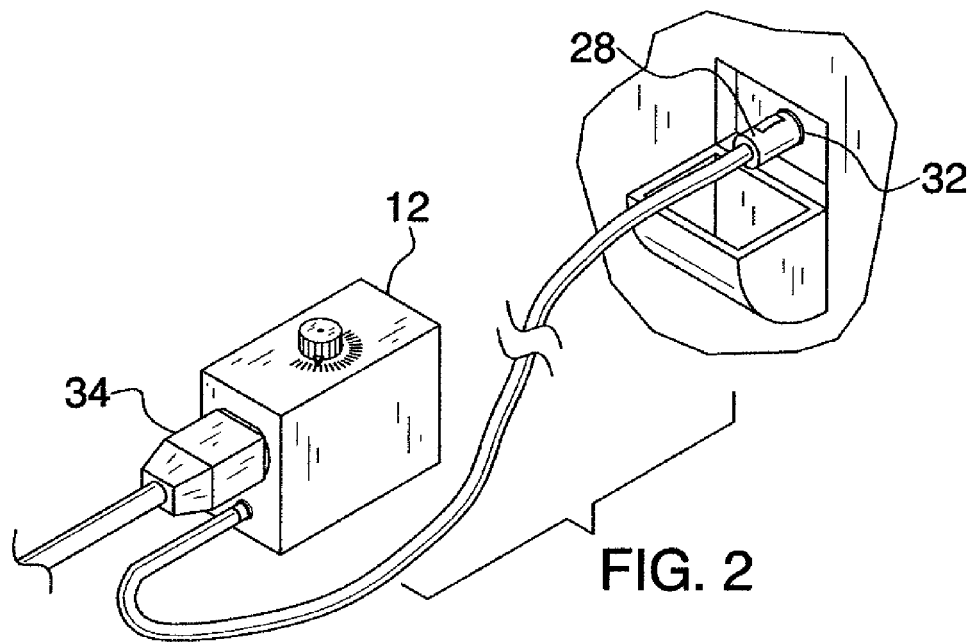
FIG. 2 is a front perspective in-use view of the present invention.
Figure 3:
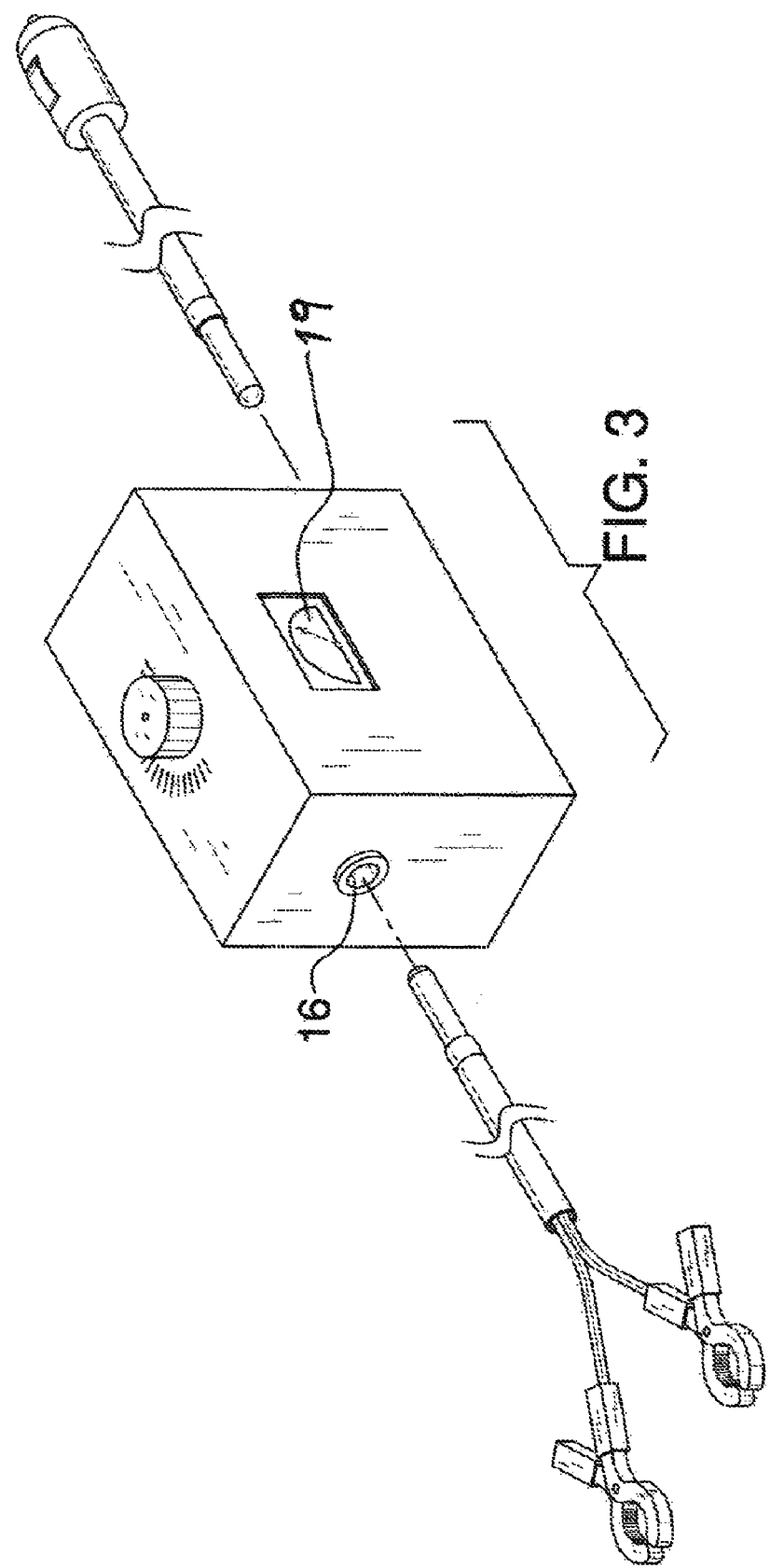
FIG. 3 is an expanded rear perspective view of the present invention.
Figure 4:
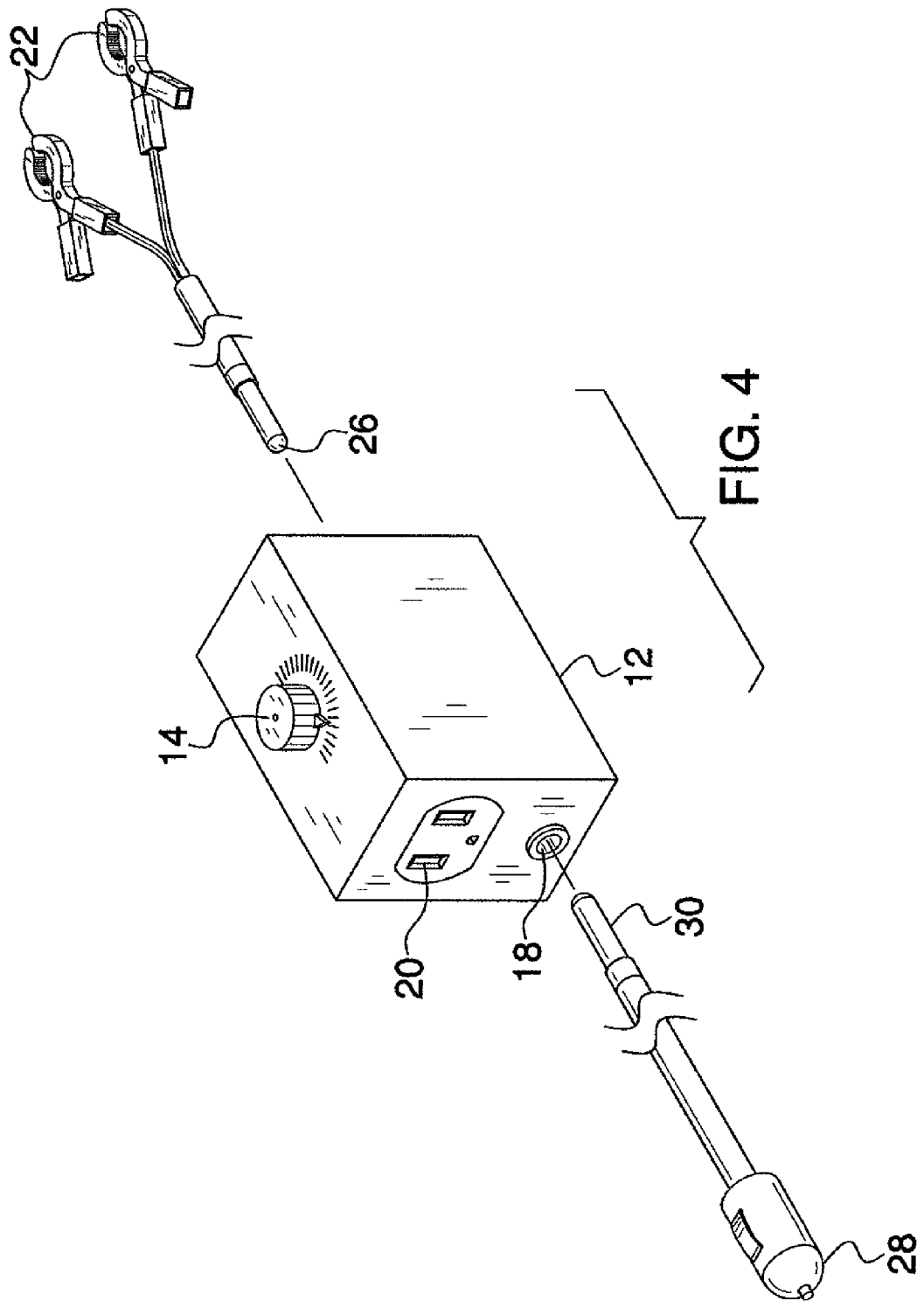
FIG. 4 is an expanded front perspective view of the present invention.
Figure 5:
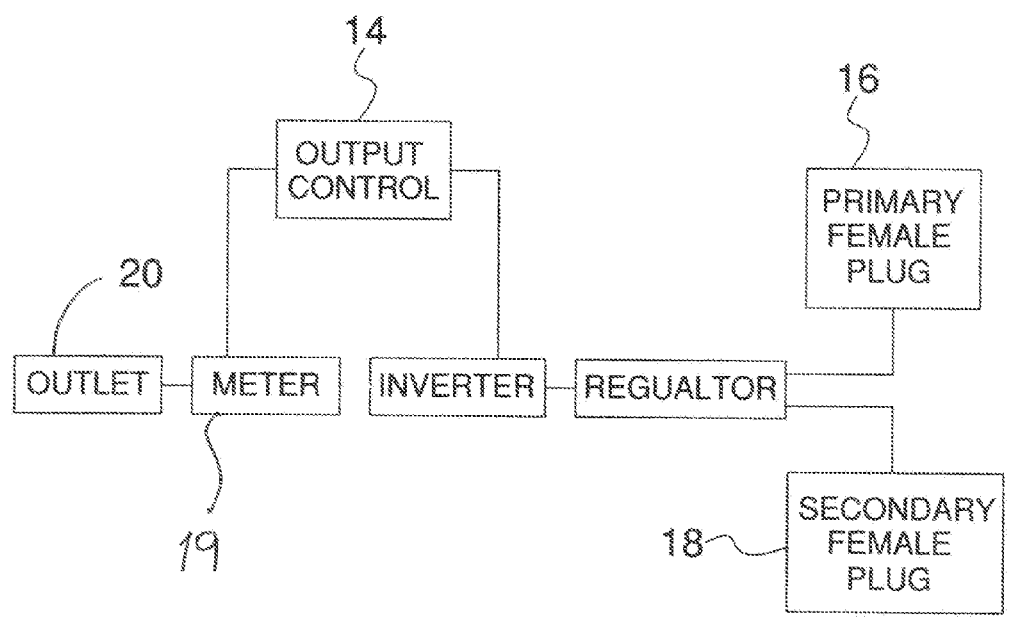
FIG. 5 is a schematic view of the present invention.

With reference now to the drawings, and in particular to FIGS. 1 through 5 thereof, a new voltage adapting device embodying the principles and concepts of the present invention and generally designated by the reference numeral 10 will be described.

As best illustrated in FIGS. 1 through 5, the voltage adapter system 10 generally comprises a conventional voltage modifier 12 to invert and regulate voltage. For example, the voltage modifier 12 may convert direct current from a 12 volt direct current vehicle battery to 120 volt alternating current. The voltage modifier 12 includes a control actuator 14 to select a desired voltage output. A primary female plug 16 is mounted on the voltage modifier 12 and is electrically coupled to the control actuator 14. The primary female plug 16 is an electrical inlet. A secondary female plug 18 is mounted on the voltage modifier 12 and is electrically coupled to the control actuator 14. The secondary female plug 18 is also an electrical inlet. A voltage meter 19 is mounted on the voltage modifier 12 and indicates a voltage output of the voltage modifier 12.

An electrical outlet 20 is mounted on the voltage modifier 12 and is electrically coupled to the control actuator 14. The electrical outlet 20 is a conventional 3 prong female plug to receive power plugs from electrical equipment.

A pair of clamps 22 is provided. Each of the clamps 22 is positionable on and electrically coupled to a pair of leads of a vehicle battery 24. A male plug 26 is electrically coupled to the clamps. The male plug 26 attached to the clamps 22 is removably extended into and electrically coupled to the primary female plug 16 to supply electricity to the voltage modifier from the vehicle battery 24.

A power port plug 28 is electrically coupled to a male plug 30. The power port plug 28 is positionable in and electrically couplable to a vehicle power port 32. The male plug 30 electrically coupled to the power port plug 28 is removably extended in and electrically coupled to the secondary female plug 18 to supply electricity to the voltage modifier 12 from the vehicle power port 32.

In use, a plug 34 from an electrically powered apparatus is extendable into the electrical outlet 20 to receive electrical power from the voltage modifier 12. The voltage modifier 12 may be electrically coupled to either a power port 32 of a vehicle or directly to the battery 24 of the vehicle to ensure greater portability and usefulness of the assembly 10.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A power adapter assembly comprising:
    a voltage modifier to invert and regulate voltage, said voltage modifier including a control actuator to select a desired voltage output, a primary female plug being mounted on said voltage modifier and being electrically coupled to said control actuator, said primary female plug being an electrical inlet;
    an electrical outlet being mounted on said voltage modifier and being electrically coupled to said control actuator;
    a pair of clamps, each of said clamps being positionable on and electrically coupled to a pair of leads of a vehicle battery, a male plug being electrically coupled to said clamps, said male plug attached to said clamps being removably extended into and electrically coupled to said primary female plug to supply electricity to said voltage modifier from the vehicle battery;

a voltage meter being mounted on said voltage modifier and indicating a voltage output of said voltage modifier; and wherein a plug from an electrically powered apparatus is extendable into said electrical outlet to receive electrical power from said voltage modifier.

2. A power adapter assembly comprising:

a voltage modifier to invert and regulate voltage, said voltage modifier including a control actuator to select a desired voltage output, a primary female plug being mounted on said voltage modifier and being electrically coupled to said control actuator, said primary female plug being an electrical inlet, a secondary female plug being mounted on said voltage modifier and being electrically coupled to said control actuator, said secondary female plug being an electrical inlet;

a voltage meter being mounted on said voltage modifier and indicating a voltage output of said voltage modifier;

an electrical outlet being mounted on said voltage modifier and being electrically coupled to said control actuator;

a pair of clamps, each of said clamps being positionable on and electrically coupled to a pair of leads of a vehicle battery, a first male plug being electrically coupled to said clamps, said first male plug attached to said clamps being removably extended into and electrically coupled to said primary female plug to supply electricity to said voltage modifier from the vehicle battery;

a power port plug being electrically coupled to a second male plug, said power port plug being positionable in and electrically couplable to a vehicle power port, said second male plug electrically coupled to said power port plug being removably extended in and electrically coupled to said secondary female plug to supply electricity to said voltage modifier from the vehicle power port; and wherein a plug from an electrically powered apparatus is extendable into said electrical outlet to receive electrical power from said voltage modifier.

3. A power adapter assembly comprising:

a voltage modifier to invert and regulate voltage, said voltage modifier including a control actuator to select a desired voltage output, a primary female plug being mounted on said voltage modifier and being electrically coupled to said control actuator, said primary female plug being an electrical inlet;

an electrical outlet being mounted on said voltage modifier and being electrically coupled to said control actuator;

a pair of clamps, each of said clamps being positionable on and electrically coupled to a pair of leads of a vehicle battery, a male plug being electrically coupled to said clamps, said male plug attached to said clamps being removably extended into and electrically coupled to said primary female plug to supply electricity to said voltage modifier from the vehicle battery;

a secondary female plug being mounted on said voltage modifier and being electrically coupled to said control actuator, said secondary female plug being an electrical inlet;

a power port plug being electrically coupled to a second male plug, said power port plug being positionable in and electrically couplable to a vehicle power port, said second male plug electrically coupled to said power port plug being removably extended in and electrically coupled to said secondary female plug to supply electricity to said voltage modifier from the vehicle power port; and wherein a plug from an electrically powered apparatus is extendable into said electrical outlet to receive electrical power from said voltage modifier.

\* \* \* \* \*